June 11, 1968 R. GOTTSCHALD 3,387,871
BALL AND SOCKET JOINTS
Original Filed July 12, 1963

INVENTOR.
Rudolf Gottschald
BY
Schlesinger, Arkwright & Harvey
ATTORNEYS

3,387,871
BALL AND SOCKET JOINTS
Rudolf Gottschald, Osterath, Germany, assignor to A. Ehrenreich & Cie, Dusseldorf-Oberkassel, Germany, a German body corporate
Original application July 12, 1963, Ser. No. 294,694, now Patent No. 3,290,073, dated Dec. 6, 1966. Divided and this application Sept. 7, 1966, Ser. No. 597,187
5 Claims. (Cl. 287—87)

ABSTRACT OF THE DISCLOSURE

A ball and socket joint having a ball part with a bore extending therethrough, sealing means around the bore and a sealing extension which is at least a coating on the ball part.

Cross-reference

This application is a division of applicant's copending application Ser. No. 294,694, filed July 12, 1963 and is now Patent No. 3,290,073.

This invention relates to ball-and-socket joints of the kind having a ball in the form of a spherical segment mounted in a housing forming the socket, and a ball pin which passes into the housing and through the ball. The pin, which is prevented from being withdrawn through the ball by a collar or head and is sealed to the housing, is rotatable in the ball and is rockable with the ball in the housing.

A bellows-like seal is usually provided in such joints at the exit of the pin from the housing, such seal bearing against the housing at one end and against the pin at the other end. Since the pin must perform both a rotary movement and an angular or tumbling movement with respect to the housing, it is very difficult to provide perfect sealing between the housing and the pin particularly if the pin is to perform relatively large angular movements.

The principal object of the invention is to obviate this disadvantage and to this end, according to the invention, two separate seals are provided at the exit of the pin from the housing, one seal being disposed between the ball and the housing while the other is disposed between the ball and the pin. In this way the sealing for the various surfaces associated with the rotary movements and the rocking or angular movements of the pin is associated with the different seals.

The seal provided for the pin rotating relatively to the ball may, for example, be a sealing ring in the form of a Simmer ring, while the seal between the ball and the housing may be a bellows-type seal. The particular advantage of this bellows-type seal over the bellows seals otherwise used in ball-and-socket joints is that the bellows seal can be much smaller because it is not subject to any stretching.

Summary

If the ball is made of a resilient material, the seal between the ball and the housing may be made by a part, such as bellows, which is integral with the ball.

If the ball is provided with a covering of resilient material, the seal between the ball and the housing may then be formed by a part, such as a bellows which is integral with the resilient covering of the ball.

Three examples of a joint constructed in accordance with the invention are illustrated in the accompanying drawings, in which.

In all three examples, the joints have a housing forming the socket which is closed at one side by a cover 2. A ball pin 4 is provided with a ball in the form of a spherical segment through which the pin 4 is fitted.

Figure 1:
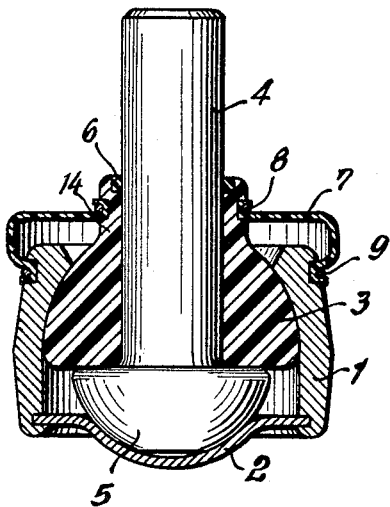
FIGURE 1 is a central longitudinal section through the first joint.
Figure 3:
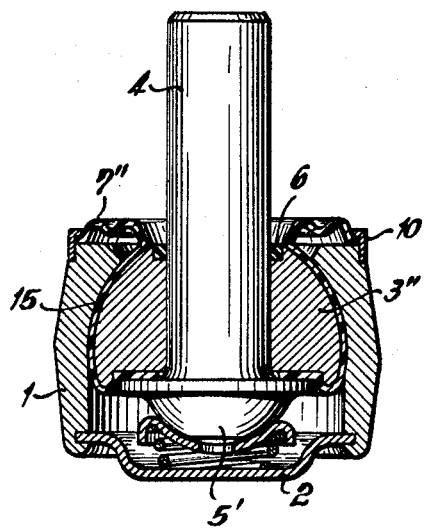
FIGURE 3 is a similar section through the third joint.
Figure 2:
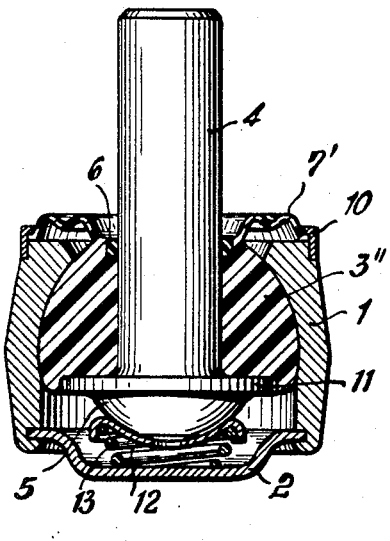
FIGURE 2 is a similar section through the second joint.

In FIGURE 1 the spherical segment is denoted by reference 3, in FIGURE 2 by 3' and in FIGURE 3 by 3". The spherical segment rests in a concave surface of the housing at the side where the pin leaves the housing. The pin is formed with a collar which bears against the spherical segment, the collar being denoted by reference 5 in FIGURE 1 and by 5' in FIGURES 2 and 3.

In the example shown in FIGURE 1, the collar 5 has a spherical surface on the side remote from the ball 3 in direct contact with a spherical part of the cover 2, while in the examples shown in FIGURES 2 and 3 the collar has a flange 11 which seats a recess in the ball element 3' and 3" and also has a spherical surface on the side remote from the pin.

A correspondingly spherical plate 12 bears against the spherical collar surface and is supported against the cover 2 by a coil spring 13.

The collar surface adjacent the cover 2 may also have a different shape and, for example, be flat, while a resilient supporting element may be disposed between the collar surface and the cover.

A seal is provided between the ball and the pin 4 and another seal is provided between the housing and the ball.

In the first example, the ball 3 which may, for example, be of resilient material has an extension 14 which passes through the aperture where the pin 4 leaves the housing. A sealing ring 6, for example a Simmer ring, is provided as a seal at the end of the extension between the ball 3 and the pin 4. A bellows seal 7 is provided between the housing 1 and the spherical segment 3. The bellows is secured to the extension 14 of the ball 3 by a clamp ring 8 and is secured to the housing 1 by a clamp ring 9.

In the second example, the ball 3' is of resilient material. The sealing ring 6, for example a Simmer ring, is inserted into the ball 3' for sealing with respect to the pin 4. The bellows 7' forming the seal between the ball and the housing 1, is formed integrally with the ball 3' and is secured to the housing by a sheet-metal ring 10 which is pressed over the housing.

In the third example, the ball 3" is of hard material, for example steel, and is provided with a resilient covering 15. The bellows 7" is formed integrally with the resilient covering and is secured to the housing in the same way as in the second example. The ball is also sealed to the pin in the same way as in FIGURE 2 by means of a sealing ring 6 inserted into the ball.

With hitherto conventional seals, the seals have not been perfectly secure. The bellows-type seal previously used had to be so secured to the pin and the housing so as to permit a rotary movement of the pin with respect to the housing with the bellows. There may be perfect sealing in the central position but when the pin is deflected and is rotated in the deflected position the bellows does not slide but is subjected to considerable extension. If the bellows does slide then it no longer bears sufficiently tightly against the pin in the central position to ensure adequate sealing. The invention mitigates these disadvantages.

While the invention has been described it will be understood that it is capable of further modifications and this application is intended to cover any variations, uses, or adaptations of the invention following in general, the principles of the invention and including such departures from the present disclosure as come within knowledge or customary practice in the art to which the invention pertains, and as may be applied to the essential features hereinbefore set forth and as fall within the scope of the invention or the limits of the appended claims.

Having thus described my invention what I claim is:

1. A ball and socket joint comprising in combination:
    (a) a hollow housing having a bore extending therethrough,
    (b) said housing having a spherical wall portion at one end of said bore defining a restricted opening,
    (c) closure means at the other end of said bore,
    (d) a first ball part having a segmental spherical outer surface and a bore extending therethrough,
    (e) said segmental spherical outer surface of said first ball part engaging said segmental spherical wall portion of said housing,
    (f) a joint stud having a shaft extending through said bore of said ball part,
    (g) a counter-bore adjacent one end of said first ball part in one of said first ball part and joint stud members,
    (h) a second segmental spherical ball part at the end of said joint stud disposed in said housing engaging said first ball part,
    (i) said first ball part having an integral flexible boot seal at one end adjacent said counter-bore projecting through said opening outwardly of said housing and permitting angular movements of said stud,
    (j) means for fixing the end of said boot seal to the outer edge of said housing, and
    (k) sealing means within said counter-bore permitting rotary motion of said stud around its axis.

2. A ball and socket joint as defined in claim 1, wherein said first ball part has a flat end and said second ball part having a flat surface engaging said flat end of said first ball part.

3. A ball and socket joint according to claim 1 wherein said extension has a wave-shaped form and projects substantially radially of the housing axis.

4. A ball and socket joint comprising in combination:
    (a) a hollow housing having a bore extending therethrough,
    (b) said housing having a spherical wall portion at one end of said bore defining a restricted opening,
    (c) closure means at the other end of said bore,
    (d) a first ball part having a segmental spherical outer surface and a bore extending therethrough,
    (e) said segmental spherical outer surface of said first ball part engaging said segmental spherical wall portion of said housing,
    (f) a joint stud having a shaft extending through said bore of said ball part,
    (g) a second segmental spherical ball part at the end of said joint stud disposed in said housing engaging said first ball part,
    (h) said first ball part having an elastic extension projecting through said opening outwardly of said housing and permitting angular movements of said stud,
    (i) means for fixing the end of said extension to the outer edge of said housing, and
    (j) said first ball part has an elastic coating and said extension is an integral part of said elastic coating.

5. A ball and socket joint comprising in combination:
    (a) a hollow housing having a bore extending therethrough,
    (b) said housing having a spherical wall portion at one end of said bore defining a restricted opening,
    (c) closure means at the other end of said bore,
    (d) a first ball part having a segmental spherical outer surface and a bore extending therethrough,
    (e) said segmental spherical outer surface of said first ball part engaging said segmental spherical wall portion of said housing,
    (f) a joint stud having a shaft extending through said bore of said ball part,
    (g) a second segmental spherical ball part at the end of said joint stud disposed in said housing engaging said first ball part,
    (h) said first ball part having an elastic extension projecting through said opening outwardly of said housing and permitting angular movements of said stud,
    (i) means for fixing the end of said extension to the outer edge of said housing, and
    (j) said first ball part having an elastic coating and said extension is a wave-shaped extension of said coating projecting substantially radially of the housing axis.

References Cited

UNITED STATES PATENTS

| 1,923,601 | 8/1933 | Weaver. | |
| 2,544,582 | 3/1951 | Booth. | |
| 3,091,486 | 5/1963 | Baker | 287—87 |
| 3,120,746 | 2/1964 | Kayser | 287—87 |

FOREIGN PATENTS

| 118,170 | 8/1918 | Great Britain. |
| 1,060,203 | 6/1959 | Germany. |
| 818,549 | 8/1959 | Great Britain. |
| 895,068 | 4/1962 | Great Britain. |

EDWARD C. ALLEN, *Primary Examiner.*

CARL W. TOMLIN, *Examiner.*

A. KUNDRAT, *Assistant Examiner.*